Figures 1, 2:
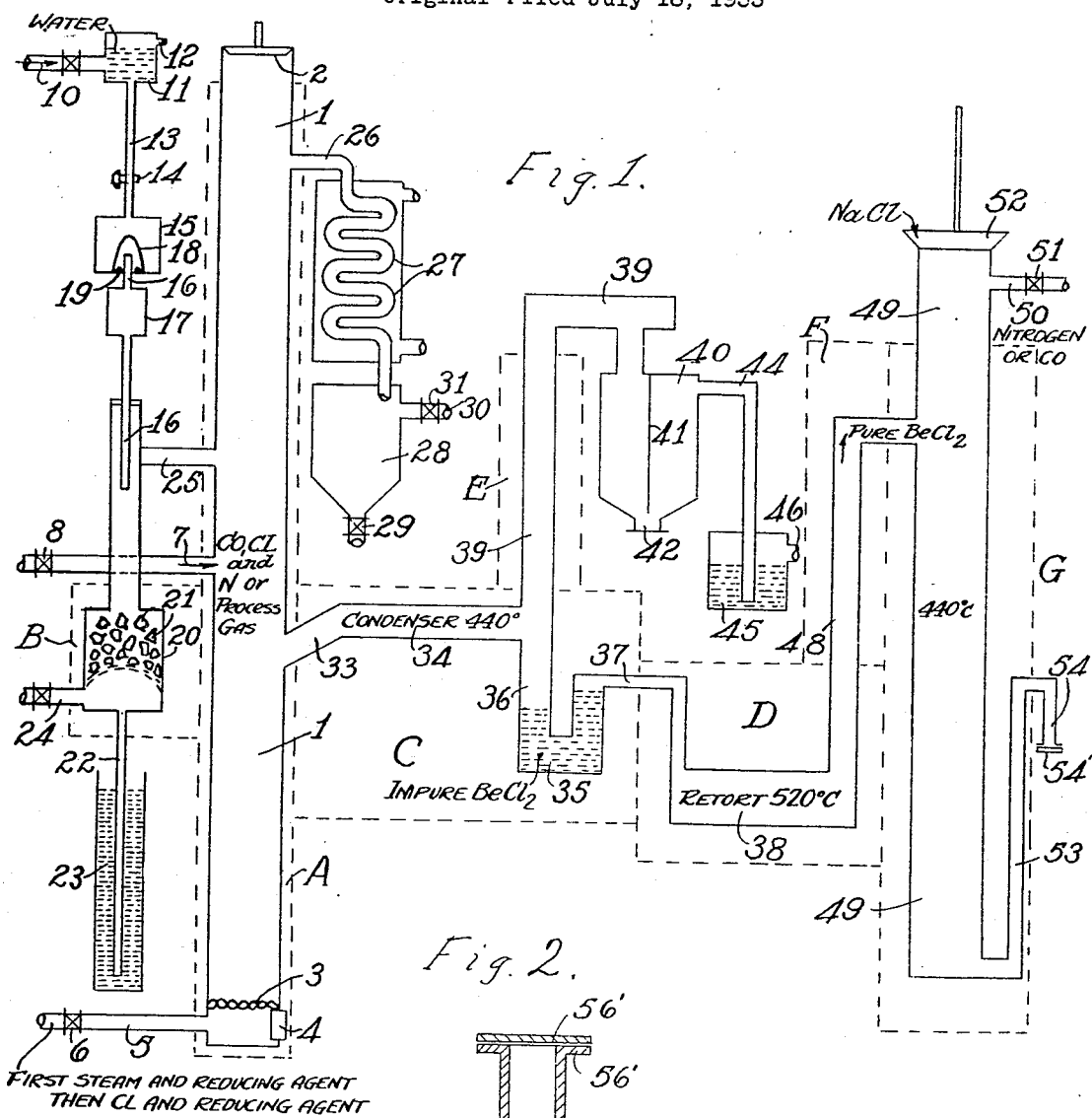

Jan. 20, 1942.    J. E. BUCHER    2,270,502
PROCESS FOR MANUFACTURING BERYLLIUM
Original Filed July 18, 1933

John E. Bucher  INVENTOR

BY
Gifford, Scull & Burgess
ATTORNEYS

Patented Jan. 20, 1942

2,270,502

UNITED STATES PATENT OFFICE 2,270,502

PROCESS FOR MANUFACTURING BERYLLIUM

John E. Bucher, Fort Lee, N. J., assignor, by mesne assignments, to Antioch College of Yellow Springs, Yellow Springs, Ohio, a corporation of Ohio Continuation of application Serial No. 680,923, filed July 18, 1933. This application February 25, 1937, Serial No. 127,791

24 Claims. (Cl. 23—17)

The preparation of beryllium from its halogen compounds by means of alkali or alkaline earth metals as well as by means of the electric current, has been known for a long time. The finely divided metal thus obtained is very likely to be contaminated with oxides, hydroxides, nitrides, silica, etc.

The principal ways in which these impurities enter is through the use of impure beryllium oxide for the preparation of the halogen compounds; from the halogenizing agents as well as from attack of the walls of the apparatus used in the process; from the moisture, oxygen and nitrogen of the air and from impurities introduced during the process of recovering the finely divided metal by leaching out halogen salts of the alkali or alkaline earth metals. These troubles are especially noticeable with beryllium chloride. Further impurities may be introduced in the subsequent treatment of the metal to obtain either a regulus or alloys.

Even when the powdered metal is briquetted and fused in an atmosphere of hydrogen, it should contain at least 80% of pure beryllium in order to enable the particles to be fused or run together when heated.

If hydrogen is present in the reagents used for changing beryllium oxide into a halogen salt, such as a chloride, it may form water with a portion of the oxygen of the beryllium oxide. The halogen compounds of beryllium and especially the chloride are decomposed with violence when they are brought into contact with water, hence it is advisable to exclude moisture as well as hydrogen very carefully. For the same reason, hydrogen compounds such as hydroxides, ammonium salts, hydrochloric acid, etc., should be excluded from the halogenating or chlorinating zone since the ultimate effect of water or anything which will form water in the halogenation or chlorination is to contaminate the resulting halogenized beryllium or beryllium chloride with beryllium oxide which interferes seriously with the subsequent preparation of pure beryllium metal or alloys.

By the present invention the leaching of fine particles of beryllium with water is entirely eliminated and the process is improved so as to eliminate the above mentioned difficulties. Also, beryllium alloys may be prepared by this invention without the necessity of first isolating the pure beryllium by leaching with water, or otherwise.

Beryllium oxide may be prepared by any convenient method for use in obtaining the halogen compound of beryllium or beryllium chloride for use in this invention, but I prefer for this purpose to "open" the beryl with lime and extract with sulphuric acid as set forth in my copending application, Serial No. 632,641, 1932 now Patent 2,010,844, issued August 13, 1935, and thus obtain the beryllium oxide. In this process of preparing the beryllium, the beryllium is finally precipitated as basic beryllium carbonate which, upon heating, loses water, carbon dioxide, ammonium salts and in some cases perhaps sulphur dioxide and trioxide to leave a residue of beryllium oxide.

It has been found that when beryllium oxide is prepared from the carbonate at a low temperature it is more reactive than when it is highly ignited and therefore it is advisable or preferable to prepare the beryllium oxide at a rather low temperature so as to have the advantage of greater speed in the chlorinating or halogenating step or process. Temperatures down to 400° C. for chlorinating have been described heretofore but the dangers or troubles arising from residual water in this procedure do not appear to have been obviated.

The present invention will be specifically described in connection with the use of a chlorinating step in the process, but other halogens may be used in a similar manner. In carrying out this invention to make beryllium chloride from the oxide chlorine or something which can furnish chlorine must be present, and some element such as sulphur or carbon or something capable of furnishing such element should also be present to combine with the oxygen to furnish energy and to eliminate oxygen as $CO_2$, $SO_2$, etc.

These reagents may, however, contain substances which cause trouble. For example, chlorinating a heated mixture of BeO and sugar charcoal is well known but the charcoal still contains a considerable amount of hydrogen and oxygen, even after long heating to redness. This causes the formation of water which in turn may contaminate the resulting chloride with enough oxide to interfere greatly with its usefulness in the preparation of beryllium metal and alloys. Another well known method is to chlorinate beryllium oxide with a mixture of chlorine and carbon monoxide. In case the carbon monoxide is produced by the very convenient method of heating formic acid with either strong sulphuric or phosphoric acids, some hydrogen will always be present which will lead to the formation of water and thus to the formation of BeO in the condensed beryllium chloride. This is true even when great care is used in drying both the chloride and the carbon monoxide with concentrated $H_2SO_4$.

Even when especially pure $CCl_4$ which was shaken out with concentrated sulphuric acid, separated in the funnel and then dried over KOH is used for furnishing the chlorine for the chlorination step trouble may arise because of contamination of the recovered metal with oxide.

By the present invention difficulties are overcome which may have been due to reversibility of the chlorinating reaction or to other causes and, at the same time, the introduction of certain impurities, especially silica or silicates that might be formed by attack of beryllium chloride (or oxide) upon the walls of the reaction vessel, such as glass, silica porcelain, fire clay, etc., is avoided.

My process will now be described in connection with the accompanying drawings in which Fig. 1 is a diagrammatic representation of an apparatus which is suitable for large scale manufacturing operation and which requires very little attention after it is adjusted at the start, and Fig. 2 is a sectional view on an enlarged scale of one of the parts.

In the drawings, the rectangular spaces, enclosed by the dotted lines designated by the letters A, B, C, D, E, F, and G represent diagrammatically heat regulators or furnaces which can be heated or the temperatures thereof regulated in any suitable way to the respective temperatures required by the operations to be conducted therein.

Reference character 1 indicates a vertical elongated retort located in the furnace A. The retort 1 is provided with a removable cover 2 at the top and a grate 3 near the bottom for supporting a charge of solid material to be treated, which may be beryllium oxide briquettes. An outlet 4 from the retort 1 is provided below the grate 3 for removing residues.

An inlet gas pipe 5 provided with a valve 6 enters the bottom of retort 1 below the grate 3, and a gas pipe 7 provided with a valve 8 enters this retort intermediate its ends, preferably near the middle thereof.

A valved water pipe 10 leads to a constant level water reservoir 11 that is provided with an overflow 12. A pipe 13 that is provided with a needle valve 14 leads from the reservoir 11 to a small tank 15, from the bottom of which a pipe 16 leads through the sight glass 17. The upper end of the pipe 16 terminates above the bottom of the tank 15 and a cap 18 is provided over the upper end of the pipe 16. The cap has a serrated edge 19 that rests upon the bottom of the tank 15 so that any sediment may settle in the bottom of this tank without entering the pipe 16.

The lower end of the pipe 16 passes into a retort 20 that is located in the furnace B. This furnace is provided with checker brickwork 21 and also with a safety exit pipe 22 that extends into a column of water in the water seal cylinder 23. A valved gas inlet pipe 24 leads into the lower portion of the retort 20. A gas and vapor pipe 25 leads from the upper portion of the retort 20 into the retort 1, entering the retort 1 in proximity to the inlet pipe 7.

An outlet pipe 26 leads from the upper portion of the retort 1 to the condenser 27. A pipe leads from the condenser 27 into the receiver 28 and a valved outlet 29 is provided at the lower portion of the receiver 28 for the removal of condensates. A gas outlet pipe 30 having a needle valve 31 therein is provided at the upper portion of the receiver 28.

An outlet 33 from the retort 1 is located a short distance below the gas inlet pipes 7 and 25, and leads to a condenser 34 which is located in the heat regulator C so that its temperature can be maintained at the desired point.

A liquid trap 35, to prevent passage of gases, is connected by the pipe 36 to the lower side of the condenser 34. A connection 37, providing a longer liquid column than the connection 36, leads from the liquid trap 35 to the retort or still 38 located in the furnace D.

An outlet 39 for gases or vapors, located in a heat regulator E, leads from the upper side of the condenser 34 to a dust collecting chamber 40. A vertical baffle 41 is provided in the chamber 40 and an outlet 42 for solids is provided at the bottom of this chamber. A gas and vapor outlet 44 is provided at the upper portion of the chamber 40 on the other side of the baffle 41 from the inlet 39. This outlet 44 leads to a water sealed chamber 45 having a gas exit 46 leading therefrom.

An outlet pipe 48 located in a heat regulator F leads from the still 38 to a condenser and reservoir 49 that is located in the heat regulator G. An inlet pipe 50 for gases provided with a stop cock 51 enters the upper portion of the receiver 49, and a gas-tight removable cover 52 is provided at the upper end of this receiver. A liquid trap 53 is connected to the lower end of the receiver 49 and is provided with an outlet 54 having a flange to which a closure 53' may be connected.

A receptacle 55 (Fig. 2) has a flange 56 that can be connected to the outlet 54 so as to form a tight joint. A closure 56 is provided for the flange 56. Inlet and outlet pipes 57 and 58 are provided for the receptacle 55 so that a gas can be circulated through this receptacle. A support 59 of refractory material, such as fire brick, is provided in the receptacle 55 for a crucible or crucibles 60 which may be of metal, such as iron, nickel or copper, for example. A graphite crucible 61 is placed in each crucible 60. A coating 62 of magnesia should be placed between the crucibles 60 and 61, when the crucible 60 is made of iron, to prevent formation of iron-graphite eutectic. A lining 63 of metal that is to be alloyed with beryllium, preferably in the shape of a cone, is provided for the crucible 61.

The apparatus may be operated either for batch runs or as a continuously operating plant.

For a batch run, the retort 1 may be filled with briquettes of beryllium oxide still containing some moisture, ammonium salts and sulphates, or the briquetted basic beryllium carbonate itself may be used if it is not heated so fast that the escaping steam and carbon dioxide disintegrate the briquettes.

After the briquettes have been introduced, the entire apparatus may then be filled with some suitable gas such as nitrogen or carbon monoxide. All stopcocks, valves and the outlet 54 being closed, valve 51 is opened to admit a gentle current of this gas and allow it to escape by fully opening the valve 31. The furnace C is heated to 440° C. and the retort 1 in the furnace A is heated to any suitable temperature such as, say, 650° to 720° C. and a mixture of steam and a current of reducing gas such as carbon monoxide is passed into the retort 1 through inlet 5. As soon as sulphur compounds are sufficiently or completely expelled through the outlet 26 the steam is shut off from the entering current of carbon monoxide. As soon as all of the moist gas in the briquette column in retort 1 has been displaced the valve 31 is closed so that the gas will then escape through the water trap 45.

A gentle current of carbon monoxide, chlorine, nitrogen or producer gas is then introduced through the inlet 7, into the heated briquette column in retort 1. Also a vigorous current consisting of about equal volumes of chlorine and carbon monoxide is passed into the retort at inlet 5. Copious formation of beryllium chloride starts immediately and passes out through the outlet 33. The chloride condenses in the condenser 34 which is kept just above the solidifying point (about 440° C.) of $BeCl_2$ while the gases consisting chiefly of $CO_2$ pass up through the vertical pipe 39 and escape through the outlet 46.

The hot viscous liquid $BeCl_2$ drains down from condenser 34, into the trap 35, and soon forms a gas seal so that the entry of gas at inlet 50, which is under very gentle pressure is stopped. The molten liquid in the trap 35 also prevents any gases such as $Cl_2$, CO, $CO_2$, HCl, and even traces of water vapor resulting from the chlorinating process, from entering into the retort 38. In this way the $CO_2$ is removed from the liquid beryllium chloride so that it cannot cause contamination of the $BeCl_2$ with BeO due to reversal of the chlorinating reaction. This trap 35 by preventing the entry of uncombined or excess chlorine into the retort or still 38 permits the use of metals which are not attacked by beryllium chloride for construction of this retort. Copper is especially suitable for constructing this retort because of its cheapness, durability and excellent heat conductivity.

During the run the furnace D is maintained at a temperature above the boiling-point (about 520° C.) of the beryllium chloride which therefore distills over into the condenser-receiver 49, leaving the harmful non-volatile oxygen containing impurities such as beryllium oxide, silica, silicates, etc., in the retort 38, which may be cleaned out when desired.

The condenser 49, which is also very advantageously made of copper may be kept just above the solidifying point (about 440° C.) of $BeCl_2$ when $BeCl_2$ is the desired product. The very pure viscous liquid beryllium chloride which has a very low vapor tension may then be drawn off through the trap 53 at 54. The operation can be continued until substantially all of the BeO briquettes have disappeared from the retort 1.

It is ordinarily much more desirable to recover the beryllium chloride in admixture with alkali chlorides such as those of sodium or potassium. These mixtures have low melting points (about 215° C. for the $BeCl_2$-NaCl eutectic mixture), and very little vapor tension and are much less hygroscopic than pure beryllium chloride. For example, sodium chloride which has been freshly ignited to expel moisture and while still hot is introduced quickly at 52 and the retort 49 is then heated to the proper temperature (about 215° C.) and then a very pure beryllium chloride-sodium chloride mixture may be drawn off at outlet 54. The composition is automatically determined by this procedure and this is very convenient in making analyses unnecessary. However, by suitably varying the temperature and rate of charging of the retort 49 with sodium chloride, substantially any composition of product between that of pure beryllium chloride and pure sodium chloride may be drawn off at outlet 54. The temperature will be changed for a beryllium chloride-potassium chloride mixture. Such a process is described and claimed in my prior Patent No. 1,988,109.

The process may be run continuously as follows: Start as before and operate until the briquette column in retort 1 has dropped somewhat but its upper end is still considerably above the level at which the inlet 25 enters this retort. Open the cover 2 momentarily and fill up with fresh briquettes of beryllium oxide or carbonate. Open the valve 8 to admit the predetermined flow of CO (for example, 2 liters per minute) through the pipe 7 and open the valve in the pipe 24 to admit the predetermined flow of CO (for example, one liter per minute) into the briquette column at 25 and at once open and set the calibrated valve 31 so that under conditions of the pressure in the system (determined by the depth of water in chamber 45) say two liters of gas per minute escape. Then open the valve 14 to permit water to drop at a rate predetermined by the capillary pipe 16 onto the fire brick in the retort 20 which is kept at a temperature above the boiling point of water. This insures a steady passage of steam into the retort at 25. This steam may have a relatively high volume but as it is again condensed in the condenser 27, it introduces no disturbance in the regulated gas volumes.

Any effect of resistance to gas flow by the briquette or friction in the pipes may readily be compensated for by the calibrated valve 31. If the figures given as in the illustration are adhered to, all of the resulting $CO_2$ and $BeCl_2$ vapors will pass into the condenser 34. All the steam entering at 25 will pass upwardly through the briquettes column in retort 1, while the pure CO entering through pipe 7 is divided, part going through the briquettes and leaving the system at the valve 31 while the rest passes downwardly out through the condenser 34 and leaves the system at the outlet 46. This division of the CO gas current at the inlet 7 therefore prevents any damage either from steam that is admitted or from moisture from the fresh briquettes, and at the same time it prevents $BeCl_2$ vapor from passing above the point where the outlet 33 to the condenser 34 is connected to the reaction retort 1. Feeding of fresh briquettes can be repeated indefinitely, thus providing continuous passage of hot purified briquettes into the top of the chlorinating zone in the retort 1, the unvaporized residue if any being withdrawn at the outlet 4.

The presence of the trap 35 for the molten beryllium chloride and maintenance of the retort 38 at higher temperatures insures a pure final product even if the beryllium chloride from condenser 34 is contaminated with non-volatile products when it enters the retort 38. The use of gases such as carbon monoxide, that are somewhat contaminated with hydrogen, is permitted through the entire system because hydrogen can do no harm to $BeCl_2$ in the retort 38 and condenser 49 and whatever harm it does in the chlorinating zone in the lower portion of the retort 1 and in the condenser 34 is rectified by the trap 35 and retort 38. For the same reason whatever aqueous moisture may remain in BeO briquettes that have been heated only moderately so as to retain great activity and introduced into the retort 1, will not prevent their use for preparing pure beryllium chloride. The hydrogen of such moisture is eliminated as HCl in the trap 45 and the oxygen is left as BeO in the retort 38. This arrangement permits the use of briquettes containing charcoal or carbon from sugar, starch, etc., which have not been heated high enough to seriously injure their reactivity as any hydrogen and oxygen remaining in the charcoal are eliminated as HCl and BeO as explained above.

When the $BeCl_2$ is allowed to flow from the condenser 34 at a temperature just above its solidifying point there is very little trouble with sublimate in the vertical pipe 39. This pipe may be heated by the furnace E either constantly or intermittently to melt any sublimates that may collect in this so that they will flow down into the trap 35, or, the more volatile parts from impurities (such as $FeCl_3$, $AlCl_3$ and even liquefied $SiCl_4$) may be volatilized and driven over into the collecting chamber 40. This effects a purification in addition to that used in purifying the BeO. Fumes may also be collected or removed very completely in a tower or column (not shown) containing sodium chloride heated to a temperature somewhat above 215° C. at the bottom and kept at room temperature at top. Such a column with heating furnace may be used instead of the collecting chamber 40.

The gases passing out at the outlet 46 are collected and the $CO_2$ therein may be used in the preparation of the BeO, if desired. When the process is run with an excess of chlorine then the exit gases at 46 may for example be used to oxidize ferrous to ferric iron in the earlier part of the process.

When the use of sulphur in the process is not to be avoided then sulphur and chlorine or sulphur chloride and chlorine, etc. may be introduced through the inlet 5 into the retort 1. In this case, $SO_2$ will be the principal exit gas at the outlet 46.

Carbon tetrachloride, which contains carbon and chlorine in the right proportion for the chlorinating reaction may be introduced either as liquid or vapor through the inlet 5 with or without other gases such as nitrogen, chlorine, carbon monoxide, etc. If the reaction is allowed to proceed to equilibrium in the heat zone, there will be no trouble from the escape of intermediate products such as $C_2Cl_6$, but even in the case of faulty operations this compound may be eliminated in the chamber 40 because of its volatility and the trap 35.

Phosgene can be used in the same way as carbon tetrachloride and has the same advantage of correct proportioning of elements for the chlorinating reaction.

In the use of carbon and chlorine the reaction may be exothermic to such an extent that little or no external heat need be supplied to the retort 1, when working on a large scale. In this case also the introduction of steam at inlet 25 and CO at inlet 7 should be carried out carefully as both of these reagents will remove some carbon from the briquettes.

The resulting gases (CO, $CO_2$ and $H_2$) resulting from the process may be collected at the outlet 30 and they may be introduced into the system again through the inlet 24. In such reactions I have found that a mixture of $H_2$ and CO (water gas) may be used in place of steam and in this case only enough water would have to be admitted to the retort 20 to replace the hydrogen that is used up chemically and that rejected with the $CO_2$.

For the preparation of pure beryllium or its alloys, the pure beryllium chloride-sodium chloride or beryllium chloride-potassium chloride mixture which flows out of the trap 53 may be collected in some suitable apparatus for example such as is illustrated in Fig. 2.

I prefer to have a thin lining 63 made of the metal which is to be alloyed with beryllium within the graphite crucible 61. This lining is conveniently drawn in a die or the metal may be folded somewhat in the manner of a filter. Its object is to prevent the molten beryllium chloride or its admixtures with alkali or alkaline earth metal halides from coming into contact with the graphite crucible, and at the same time it furnishes part (or even all) of the metal to be alloyed with the beryllium.

An atmosphere of an inert gas such as argon, helium or hydrogen may be maintained by means of the inlet 57 and outlet 58 in the crucible 61 and such gases should be as free as possible from water vapor, oxygen, nitrogen, carbon dioxide, carbon monoxide, ammonia, sulphides, etc. Commercial hydrogen which contains a little free oxygen, may be passed over some contact material at a white heat, cooled, and then dried with phosphorus pentoxide or liquid air and used for this purpose.

Argon or hydrogen, for example, may be advantageously purified by the following procedure as it removes all of the above cited impurities in one operation and it is especially convenient. A tower containing iron turnings, wool, shavings, pieces of wire, nails, etc., which expose a large surface and are still porous enough to permit flow of gas, is heated to say 1000° to 1050° C. The argon or hydrogen mixed with an excess of sodium vapor is then passed through the incandescent column and the products are then passed through a cooler porous mass of iron, which condenses volatile salts and sodium and filters out fumes. The nitrogen and carbon are removed as sodium cyanide, sulphur is removed as sodium sulpho-cyanide or sodium sulphide and oxygen is removed as an oxide of sodium or as products such as carbonate or cyanate derived from it.

The receptacle 55 containing the empty crucible or crucibles 61 is heated to about 900° to 1000° C. A current of pure hydrogen is kept flowing to remove moisture and reduce any oxides which may be present. After cooling, the receptacle 55 is attached to the flange 54 to collect the requisite charge of beryllium chloride-sodium chloride mixture or beryllium chloride-potassium chloride mixture so as to avoid exposure of the charge to air or moisture. With the hydrogen still flowing, the receptacle 55 is then transferred to a furnace and heated until the charge is melted. Small pieces of sodium, which may be prepared by forcing the sodium from a press into an apparatus filled with pure hydrogen so arranged that the rod of sodium can be cut into suitable lengths as it is extruded are dropped into the molten charge in the lining 63 of the graphite crucible 61. This procedure prevents contact of sodium with the moisture of the air and thus avoids contamination of the charge with oxygen from this source.

The reaction starts below a red heat and is very violent at first, but as the percentage of beryllium chloride in the mixture decreases, the reaction becomes less violent and the temperature is gradually raised to prevent solidified salt from accumulating and thus prevent contact of the sodium with the beryllium chloride. I prefer to complete the run above the melting point of the halide remaining at the end of the run. This may be somewhat above 800° C. when sodium chloride is used to collect the BeCl₂ vapor, but need not be over above 650° C. when potassium chloride is used.

Stirring of the contents of the crucible 61 is described in order to cause the particles or spangles of metallic beryllium to contact with the metal with which it is to alloy. An additional object of the above cited stirring during the addition of the sodium is to get the liberated beryllium and sodium under the surface of the molten sodium chloride, which shields them from destructive impurities if such remain in the hydrogen.

It is possible to so operate by adding the sodium in larger pieces to get a violent reaction and the beryllium spangles may partially sinter and even form some globules. This may be aided by keeping the temperature low enough so that some of the sodium chloride salt solidifies as the BeCl₂ becomes used up. Ordinarily, however, I prefer to have a stout wire bent to a loop at the lower end rotating in the solution until the reaction is completed to cause contact of beryllium and alloying metal.

In this way, a molten bath of sodium chloride is present in which are suspended a multitude of beryllium spangles with no impurities coating their surfaces. In this condition and despite their high melting point (1278° C.) they alloy upon further heating with metals such as copper, for example, with great ease and rapidity. Copper melts at 1084° C. while the copper-beryllium eutectic alloy containing about 4.2% of Bé. melts at about 865° C. and the alloy with 12% of Bé. melts at 925° C. If the temperature of the bath is raised up to say 900° to 1020° C. the portion of copper lining 62 that is in contact with the spangles melts down at once to a copper-beryllium alloy while the copper part above the fused salt remains unchanged. For sampling, a heavy copper wire, with a loop on end, may be plunged down into the thick sludge of hot beryllium spangles in the crucible 61. If it is not withdrawn almost instantly after as the sodium chloride which become chilled on its cold surface melts, the whole loop and lower end of the copper quickly becomes alloyed with the spangles and melts away.

By using known weights of sodium, beryllium salts and copper and guarding against losses by spattering or volatility, alloys of any predetermined composition can be readily made. It is very easy to get master copper-beryllium alloys containing 12% to 15% or more of beryllium at very reasonable temperatures.

Both the receptacles 55 and the thin inner crucible 61 may be made of copper. Copper has the advantage of better heat conductivity over iron, is impervious to hydrogen at a red heat and the outer surface can be kept free from oxide if the furnace gases are slightly reducing. When a copper receptacle 55 is used there is no danger of insidious introduction of oxygen from the furnace through the walls of this receptacle to form water with hydrogen and thus cause contamination of the beryllium spangles. When an iron receptacle 55 is used the danger of damage due to oxidation of iron may however be avoided by having the furnace gases very strongly reducing or by surrounding the receptacle 55 with an atmosphere of hydrogen, etc.

Finely divided beryllium rapidly attacks clay or porcelain, but graphite crucibles, because of the low operating temperature and almost immediate removal of beryllium spangles by solution in metals and formation of alloys such as copper and silver, give very satisfactory results. Graphite contains no oxygen (barring the almost infinitesimal oxygen content of its ash) and is, therefore, free from the most serious trouble encountered in the manufacture of beryllium and its alloys.

During the run one of the tubes 57 and 58 of the receptacle 55 is kept closed so that the hydrogen gas current will escape at the upper flange 56 if there is leakage and keep out air. When the run has been completed, the receptacle 55 is closed with a cover such as the cover 56' and is allowed to cool under a slight positive hydrogen pressure to prevent air getting in while it might still do harm.

The present invention is especially well adapted for the isolation of beryllium spangles. When the run is made as described above but the temperature is not raised above say about 820° C., a liquid copper-beryllium alloy is not formed although the surface of the copper lining shows the formation of a solid solution. After cooling, the thin copper lining (which remains intact) can be lifted out and separated from the cone of alkali chloride-spangle mixture. This can be powdered and leached quickly to remove the chloride. In such a case the graphite crucible 61 may with advantage be replaced by one of fire clay. Also, the entire system of crucibles may be replaced by a copper or nickel beaker.

Graphite for the crucible 61 is very serviceable but crucibles of magnesia, alumina, magnesium aluminate, zirconia, highly ignited beryllium oxide, beryllium aluminate and analogous compositions may be used.

In large scale work, alloys may be made under such conditions that the outside of the alloying metal is kept cool enough to remain solid and thus serve as crucibles that will not furnish contaminating impurities from their walls.

I may also take beryllium chloride vapor from the apparatus at 54 or from the outlet 33 and bring it and sodium vapor into reactions with or without diluent gases. These substances may be caused to impinge against a mass of alloying metal to form an alloy which will drain away as liquid while the remaining metal itself remains solid. The two vapors of sodium and beryllium chloride may be caused to react under molten sodium chloride, etc., to form pure molten beryllium, or, with an alloying metal that is present to form alloys. When cuprous chloride is fed in gradually as the sodium is added it supplies part of the copper, and at the same time by alloying with the beryllium the increased specific gravity causes more prompt settling of the spangles.

The following information is given to enable the user of the process and apparatus of this invention to select the gases which should be introduced into the retort 1, and the temperatures that should be used when briquettes of beryllium carbonate or beryllium oxide containing impurities are treated to obtain purified beryllium oxide preparatory to converting their beryllium oxide into beryllium chloride.

A sample of basic beryllium carbonate lost about 54% in weight upon heating seven hours at 400° C. and 54.7% after heating another hour at 500° C., and then after many hours more of heating up to 1050° C., it lost 56.2%. It is probable that the losses around 500° C. were water or ammonium salts which also contain hydrogen. With other samples the heating of the basic carbonate was completed at 1050° C. in large clay crucibles and the product cooled in air, but, while still warm, transferred to a large glass tube. Upon heating to 650° C. a considerable quantity of water invariably condensed in the cold end of the tube. These tests show that finely divided beryllium oxide retains or adsorbs water very tenaciously and that great care must be exercised if damage in chlorinating is to be avoided.

The other impurities likely to be present in beryllium oxide are silica, alumina, ferric oxide, lime, magnesia and sulphates. Silica is eliminated in the chlorination as the very volatile silican tetrachloride. Iron volatilizes very quickly as ferric chloride, sublimes out and can be removed before there is much action on the beryllium oxide. Aluminium chloride is also eliminated because it is much more volatile than beryllium chloride. Lime and magnesia are converted into non-volatile chlorides so that they with alkali or other non-volatile chlorides remain as harmless residues.

Despite great care it is practically impossible to wash out all sulphates from the basic carbonate when it has been precipitated from strong beryllium sulphate solutions. Also, because beryllium sulphate forms basic sulphates it becomes increasingly difficult to expel $SO_3$, as the ratio of the BeO increases, without heating to a temperature high enough to make the oxide less reactive than is desirable.

By introducing a current of carbon monoxide into the retort not only are traces of sulphate removed but pure beryllium sulphate is converted quantitatively into oxide at comparatively low temperatures. First, a large quantity of water is driven off, then some ammonia and ammonium salts, then sulphur dioxide, sulphur and hydrogen sulphide in that order. The evolution of hydrogen sulphide may be very abundant at the maximum temperature of 650° C. In case of purer material not much more than a strong odor of $H_2S$ is noticeable towards the end of the heating. The resulting product contains practically no sulphates, but will give an odor of hydrogen sulphide when heated with dilute acid. Dry hydrogen will give substantially the same result as dry carbon monoxide.

When pure $BeSO_4.4H_2O$ is used in the retort I it is first dehydrated at about 220° C. and then heated in a current of dry carbon monoxide. Water is first expelled and at 450° C. very little $H_2S$ is noticed but at 650° C. $H_2S$ is evolved copiously. Very little S or $H_2SO_4$ is formed but there is a large amount of $SO_2$ and $H_2S$. The white product contains practically no sulphate but on solution in acid it gives a very strong odor of $H_2S$ thus showing the presence of a beryllium sulphide. Dry hydrogen gives substantially the same result.

When pure beryllium sulphate is introduced into the retort I and carbon monoxide bubbled through warm water so as to carry along moisture was passed through the retort, the products removed are some $H_2SO_4$, very much $SO_2$, some $H_2S$ and no sulphur. Some of these products are removed at a temperature below 500° C. At 650° C. the reaction is quite rapid while at 720° C., it is substantially complete. The purified product is somewhat resistant to solution in hydrochloric acid and neither sulphates nor sulphides are present in appreciable amounts.

When pure beryllium sulphate is introduced into the retort and dry air is used instead of carbon monoxide for the gas current, neither sulphur nor $H_2S$ and only very little $SO_2$ passes off. A volatile oily liquid, presumably a polymerization product of $SO_3$ is formed in large quantity and it fumed very strongly in moist air.

When pure beryllium sulphate is introduced into the retort I and air is bubbled through warm water to saturate it with moisture and it is then passed through the retort, copious, dense fumes of $H_2SO_4$ are evolved and at the end a little $SO_2$. Neither sulphur nor $H_2S$ are evolved in appreciable amounts at 720° C. The residue contains only a small amount of sulphates.

The presence of $SO_3$ opposes the reaction of converting $BeSO_4$ to BeO and therefore its removal is advantageous. It may be removed by reducing agents such as CO and $H_2$ to reduce the $SO_3$ to $SO_2$, S and $H_2S$. Water vapor alone is also helpful for this purpose. Heating alone will remove the sulphate group from beryllium carbonate but the reduction may go too far and result in fixing some of the sulphur as a sulphide. When water vapor is added to the reducing agent the beryllium sulphide is hydrolyzed to $H_2S$ and BeO (or beryllium hydroxide which at the temperature used breaks into water and BeO). I prefer to have the water and reducing agent act simultaneously but they may alternate or the water vapor may even be admitted after the reduction is completed to then decompose the sulphide with elimination of $H_2S$.

A very great variety of reducing agents may be used to effect the elimination of sulphur as above described. Among the cheaper ones are hydrogen; carbon monoxide; hydrocarbons; alcohols, such as wood alcohol, ethyl alcohol, etc.; aldehydes such as formic and acetic; acids such as formic, acetic, etc.; ketones, such as acetone; commercial gases such as water gas, producer gas, etc. Even sulphur or sulphur containing substances such as $CS_2$ and $H_2S$ may be used to reduce the $SO_3$.

I prefer ordinarily to work at atmospheric pressure but the reactions can be carried out at diminished pressures, or at pressures above atmospheric.

The reducing substances need not be gases or liquids as is the case with most of those above mentioned. Carbon, such as sugar charcoal, sugar, starch, etc., are useful. This is particularly the case when it is desired to use chlorine with a mixture of beryllium oxide and carbon for the preparation of the chloride. In this case I prefer to mix ash-free substances such as sugar, starch, carbon, etc., with BeO and then briquette the dry substances by pressure alone or I may use pressure plus slight heating in case of fusible substances such as sugar.

The process and apparatus described and the examples given serve merely as illustrations, and I do not wish to be limited by them as a large number of modifications within the scope of this invention will be obvious to one skilled in the art.

This application is a continuation of my prior co-pending application, Serial No. 680,923, filed July 18, 1933.

I claim:

1. The process which comprises heating an impure beryllium compound containing oxygen the impurity of which is volatile upon heating and simultaneously passing a current of gas containing carbon monoxide into contact therewith in the absence of reagents which would form volatile compounds of beryllium whereby impurities are removed and purified beryllium oxide is obtained.

2. The process which comprises heating impure beryllium carbonate the impurity of which is volatile upon heating and simultaneously passing into contact therewith a current of carbon monoxide free from reagents which react with beryllium oxide at the temperature of treatment whereby impurities are removed and purified beryllium oxide is obtained.

3. The process which comprises heating beryllium compounds of the class consisting of carbonates and oxides and containing as impurities, ammonium and sulphate radicals and simultaneously passing into contact therewith at a temperature at which impurities are removed by volatilization, a current of gas containing free hydrogen free from reagents which react with beryllium oxide at the temperature of treatment whereby purified beryllium oxide is obtained.

4. The process which comprises heating an impure beryllium compound containing oxygen the impurity of which is volatile upon heating and simultaneously passing a current of gas containing carbon monoxide and water vapor into contact therewith whereby impurities are removed and purified beryllium oxide is obtained.

5. The process which comprises heating briquettes of a beryllium compound containing oxygen and a volatile radical, removing volatile products by means of a gas current containing carbon monoxide free from reagents which would react with beryllium oxide at the temperature of treatment and treating resulting beryllium oxide with a halogenizing compound.

6. The process which comprises briquetting a beryllium compound containing oxygen and a volatile radical, heating said briquettes to a temperature at which volatile products are released, removing volatile products by passing through said briquettes a gas current containing carbon monoxide free from reagents which would react with beryllium oxide at the temperature of treatment and treating resulting beryllium oxide, while it is still hot, with a gaseous current containing a halogenizing reagent to produce a halogen compound of beryllium.

7. The process which comprises halogenizing beryllium oxide, removing vapors of halogenized beryllium, condensing them as a liquid, using the resulting body of liquid as a gas tight seal for the liquid outlet from the condensing space, and removing liquid from this body as more is added thereto by condensation.

8. The process which comprises halogenizing beryllium oxide, removing vapors of halogenized beryllium, condensing them as a liquid, separating the liquid from uncondensed gases, using the resulting body of liquid as a gas tight seal for the liquid outlet from the condensing space, removing liquid from this body as more is added thereto by condensation and removing the uncondensed gases through another liquid seal.

9. The process which comprises halogenizing beryllium oxide in a heated zone, removing vapors of halogenized beryllium from an intermediate portion of said zone, condensing them as a liquid, using the resulting body of liquid as a gas tight seal for the liquid outlet from the condensing space, and removing liquid from this body as more is added thereto by condensation.

10. The process which comprises halogenizing beryllium oxide, removing vapors of halogenized beryllium, condensing them as a liquid and using the liquid as a gas tight seal for the liquid outlet from the condensing space and distilling said liquid.

11. The process which comprises heating an impure beryllium compound containing oxygen and simultaneously passing a current of gas containing carbon monoxide and steam into contact therewith whereby impurities are removed and purified beryllium oxide is obtained.

12. The process which comprises heating the upper portion of a column of beryllium compound containing oxygen and a volatile radical and simultaneously passing a current of carbon monoxide containing gas free from reagents which would react with beryllium oxide at the temperature of treatment through said column, and heating the resulting material in the lower portion of said column in the presence of a halogenizing agent.

13. The process which comprises heating the upper portion of a column of beryllium compound containing oxygen and a volatile radical and simultaneously passing a current of carbon monoxide containing gas through said column, and heating the resulting material in the lower portion of said column while passing chlorine and carbon monoxide therethrough.

14. The process which comprises heating briquettes of a beryllium compound containing oxygen, removing volatile products by means of a gas current containing a carbon containing reducing agent free from reagents which would react with beryllium oxide at the temperature of treatment, and treating resulting beryllium oxide with a halogenizing compound and a reducing agent.

15. The process which comprises heating briquettes of a beryllium compound containing oxygen, removing volatile products by means of a gas current containing a hydrogen containing reducing agent free from reagents which would react with beryllium oxide at the temperature of treatment, and treating resulting beryllium oxide with a halogenizing compound and a reducing agent.

16. The process which comprises heating briquettes of a beryllium compound containing oxygen, removing volatile products by means of a gas current containing a reducing agent, and treating resulting beryllium oxide while it is still hot with a gaseous current containing a halogen compound and a reducing agent.

17. The process which comprises heating briquettes of a beryllium compound containing oxygen, removing volatile products by means of a gas current containing a reducing agent and water vapor free from reagents which would react with beryllium oxide at the temperature of treatment, and treating resulting beryllium oxide with a halogenizing compound and a reducing agent.

18. The process which comprises heating a column of beryllium oxide, introducing chlorine and carbon monoxide into the lower portion of said mass, introducing chlorine and carbon monoxide intermediate the upper and lower portions of said mass, withdrawing volatile impurities from the upper portion of said mass, and withdrawing beryllium chloride between the points where the chlorine and carbon monoxide are introduced.

19. The process which comprises reacting upon beryllium oxide with chlorine in a heated zone and withdrawing impurities from a point above that at which the chlorine is added, and withdrawing beryllium chloride thereby formed from a point below that at which the impurities are removed and below the top of the beryllium oxide where the temperature is sufficiently high to volatilize the beryllium chloride.

20. The process which comprises heating beryllium compounds containing sulphate, and simultaneously passing a current of gas containing a reducing agent into contact therewith at a temperature at which the sulphate is decomposed with formation of beryllium oxide in which the current of gas which is passed for decomposition of the sulphate includes water vapor.

21. The process which comprises heating a material containing beryllium oxide combined with a volatile radical to substantially within the range 650° to 720° C., keeping the temperature from substantially exceeding said range, passing therethrough a current of gas which does not react with beryllium oxide in said temperature range until the material is substantially all converted to beryllium oxide, subjecting the resulting beryllium oxide in the form of a cohesive but permeable briquette to a flow of gases adapted to react therewith.

22. The process which comprises heating a material containing beryllium oxide and a combined volatile radical to substantially within the range 650° to 720° C., keeping the temperature from substantially exceeding said range, passing therethrough a current of gas which does not react with beryllium oxide in said temperature range until the beryllium oxide of the material is substantially entirely free from said volatile radical and a very reactive form of BeO is produced, and chlorinating the resulting oxide by reaction with a gaseous chlorinating agent at a low red heat.

23. The process which comprises heating a material containing beryllium oxide and a combined volatile radical to substantially within the range 650° to 720° C., keeping the temperature from substantially exceeding said range, passing therethrough a current of gas which does not react with beryllium oxide in said temperature range, until the beryllium oxide of the material is substantially entirely free from said volatile radical and a very reactive form of beryllium oxide is produced.

24. The process which comprises heating a material containing beryllium oxide and a combined volatile radical to substantially within the range 650° to 720° C., keeping the temperature from substantially exceeding said range, passing therethrough a current of a reducing gas which does not react with beryllium oxide in said temperature range, until the beryllium oxide of the material is substantially entirely free from said volatile radical and a very reactive form of beryllium oxide is produced.

JOHN E. BUCHER.

CERTIFICATE OF CORRECTION.

Patent No. 2,270,502.  January 20, 1942.

JOHN E. BUCHER.

It is hereby certified that error appears in the printed specification of the above numbered patent requiring correction as follows: Page 7, second column, lines 34, 42, 51 and 58, claims 14 to 17, before "removing" insert --and a volatile radical--; and that the said Letters Patent should be read with this correction therein that the same may conform to the record of the case in the Patent Office.

Signed and sealed this 29th day of December, A. D. 1942.

(Seal)

Henry Van Arsdale,
Acting Commissioner of Patents.